United States Patent
Nagata

(10) Patent No.: US 9,598,263 B2
(45) Date of Patent: Mar. 21, 2017

(54) ELEVATOR DEVICE

(75) Inventor: Ayako Nagata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 427 days.

(21) Appl. No.: 14/371,055

(22) PCT Filed: Mar. 2, 2012

(86) PCT No.: PCT/JP2012/055417
§ 371 (c)(1),
(2), (4) Date: Jul. 8, 2014

(87) PCT Pub. No.: WO2013/128640
PCT Pub. Date: Sep. 6, 2013

(65) Prior Publication Data
US 2014/0374196 A1    Dec. 25, 2014

(51) Int. Cl.
B66B 1/34    (2006.01)
B66B 1/24    (2006.01)
(Continued)

(52) U.S. Cl.
CPC ............ B66B 1/2408 (2013.01); B66B 1/468 (2013.01); B66B 3/002 (2013.01); G10L 15/00 (2013.01);
(Continued)

(58) Field of Classification Search
CPC ....... B66B 1/2408; B66B 1/468; B66B 3/002; B66B 2201/4646; G10L 15/00; G10L 17/22
(Continued)

(56) References Cited

U.S. PATENT DOCUMENTS 4,534,056 A * 8/1985 Feilchenfeld ........... B66B 1/468
340/5.52
4,590,604 A * 5/1986 Feilchenfeld ........... B66B 1/468
704/272
(Continued)

FOREIGN PATENT DOCUMENTS

CN    2315097 Y    4/1999
CN    102171124 A    8/2011
(Continued)

OTHER PUBLICATIONS

International Search Report issued Jun. 12, 2012, in PCT/JP12/055417, filed Mar. 2, 2012.
(Continued)

Primary Examiner — Anthony Salata
(74) Attorney, Agent, or Firm — Oblon, McClelland, Maier & Neustadt, L.L.P.

(57) ABSTRACT

An elevator device includes a voice input device, a voice recognition device, a call registration device, and an announcement control device. Upon receipt of an announcement request for a second announcement having higher priority than a first announcement while the announcement control device is causing the announcement output device to output the first announcement, the announcement control device stops the first announcement and causes the announcement output device to output the second announcement. The announcement control device also determines whether the re-output of the first announcement is necessary. In the case where the announcement control device determines that the re-output of the first announcement is necessary, upon finish of the second announcement, the announcement control device causes the announcement output device to re-output the first announcement.

11 Claims, 2 Drawing Sheets

(51) Int. Cl.
*B66B 3/00* (2006.01)
*G10L 15/00* (2013.01)
*G10L 17/22* (2013.01)
*B66B 1/46* (2006.01)

(52) U.S. Cl.
CPC ...... *G10L 17/22* (2013.01); *B66B 2201/4646* (2013.01)

(58) Field of Classification Search
USPC ........ 187/247, 380–389, 391–393, 396, 399, 187/901
See application file for complete search history.

(56) References Cited

U.S. PATENT DOCUMENTS

| | | | | |
|---|---|---|---|---|
| 5,913,196 | A * | 6/1999 | Talmor | G10L 17/00 704/270 |
| 5,952,626 | A * | 9/1999 | Zaharia | B66B 1/468 187/381 |
| 6,223,160 | B1 * | 4/2001 | Kostka | B66B 1/468 187/380 |
| 6,397,976 | B1 * | 6/2002 | Hale | B66B 11/0438 187/254 |
| 6,902,041 | B2 | 6/2005 | Eccleston | B66B 1/463 187/380 |
| 6,986,408 | B2 * | 1/2006 | Takeuchi | B66B 1/14 187/247 |
| 7,711,565 | B1 * | 5/2010 | Gazdzinski | B66B 3/00 187/396 |
| 7,936,249 | B2 * | 5/2011 | Friedli | B66B 1/468 340/5.5 |
| 8,061,485 | B2 * | 11/2011 | Finschi | B66B 1/468 187/384 |
| 8,439,169 | B2 * | 5/2013 | Iio | B66B 1/2458 187/387 |
| 8,678,142 | B2 * | 3/2014 | Takeuchi | B66B 1/468 187/247 |
| 2011/0168499 | A1 | 7/2011 | Takeuchi | |

FOREIGN PATENT DOCUMENTS

| | | |
|---|---|---|
| EP | 2 540 652 A1 | 1/2013 |
| JP | 58-4560 | 6/1981 |
| JP | 61-151971 | 9/1986 |
| JP | 62-70184 | 3/1987 |
| JP | 07-008708 | 2/1995 |
| JP | 2609687 | 5/1997 |
| JP | 10-104011 A | 4/1998 |
| JP | 2003-335468 | 11/2003 |
| JP | 2006-327739 | 12/2006 |
| JP | 3946917 | 7/2007 |
| WO | 2010-038304 | 4/2010 |
| WO | WO 2011/104817 A1 | 9/2011 |

OTHER PUBLICATIONS

English translation of the International Preliminary Report on Patentability and Written Opinion issued Sep. 12, 2014, in PCT/JP2012/055417 filed Mar. 2, 2012.

Office Action issued Apr. 7, 2015 in Japanese Patent Application No. 2014-501936 (with partial English language translation).

Combined Chinese Office Action and Search Report issued Sep. 16, 2015 in Patent Application No. 201280070458.3 (with Partial English Translation and English Translation of Category of Cited Documents).

* cited by examiner

No. 3 : CALL REGISTRATION DEVICE
No. 7 : CONDITION DETERMINATION SECTION
No. 8 : VOICE ANALYSIS SECTION
No. 9 : RE-OUTPUT DETERMINATION SECTION
No. 10: STORAGE SECTION
No. 11: OUTPUT CONTROL SECTION

ELEVATOR DEVICE

TECHNICAL FIELD

The present invention relates to an elevator device.

BACKGROUND ART

Patent Literature 1 to Patent Literature 3 each describe a device through the use of which a user registers his or her call by inputting his or her voice. In the devices described in Patent Literature 1 and Patent Literature 2, results of assignment to a call are announced. In the device described in Patent Literature 3, the start of the acceptance of a voice input is announced.

Patent Literature 4 describes a technique for announcing various kinds of information to an elevator user.

For example, first information and second information having higher priority than the first information exist. In the device described in Patent Literature 4, when a request for an announcement concerning the second information is made while the first information is being announced, the announcement which is presently being made is suspended and the second information is announced. Then, when the announcement concerning the second information is finished, the announcement concerning the first information is started again.

CITATION LIST

Patent Literature

Patent Literature 1: Japanese Utility Model Laid-Open No. 58-4560
Patent Literature 2: Japanese Utility Model Laid-Open No. 61-151971
Patent Literature 3: Japanese Patent Laid-Open No. 2006-327739
Patent Literature 4: Japanese Patent Publication No. 7-8708

SUMMARY OF INVENTION

Technical Problem

In the devices described in Patent Literature 1 to Patent Literature 3, only information concerning call registration can be announced. In the case where other information concerning elevators is announced, it is necessary to install another speaker. This case has the problem that if the timing of announcement overlaps, users cannot hear accurate contents.

In the device described in Patent Literature 4, a user may be confused by the restart of the announcement concerning the first information. For example, a user uses a device for registering calls at an elevator hall, and when a car for the user arrives at the hall, the user boards the car and leaves the hall. In the case where it takes a long time to make the announcement concerning the second information, it is conceivable that upon completion of the announcement, the user has already left the hall. The announcement becomes useless even if the first information is announced in that condition. There occurs also the problem that a user who comes into the hall later is confused.

The present invention is made in order to solve the problems described above and an object of the present invention is to provide an elevator device capable of announcing appropriate information at appropriate timing even in the case where a device for registering calls by inputting voices is installed.

Solution to Problem

An elevator device of the present invention is a device which comprises a voice recognition device which performs prescribed voice recognition processing of voice data inputted from the voice input device and determines whether the voice data is in agreement with pre-registered data under prescribed conditions, a call registration device which, in the case where the voice recognition device determines that the voice data is in agreement with the pre-registered data, sends a call registration request corresponding to the pre-registered data, a control device which performs car response control on the basis of the call registration request received from the call registration device, and an announcement control device which controls an announcement output device on the basis of an announcement request from the voice recognition device and an announcement request from the control device. The announcement control device, upon receipt of an announcement request for a second announcement having higher priority than a first announcement while the announcement control device is causing the announcement output device to output the first announcement, stops the first announcement and causes the announcement output device to output the second announcement. The announcement control device determines whether re-output of the first announcement is necessary. In the case where the announcement control device determines that the re-output of the first announcement is necessary, upon finish of the second announcement, the announcement control device causes the announcement output device to re-output the first announcement.

Advantageous Effect of Invention

According to the present invention, it is possible to announce appropriate information at appropriate timings even in the case where a device for registering calls by inputting voices is installed.

DESCRIPTION OF EMBODIMENT

The present invention will be described in detail with reference to the accompanying drawings. In each of the drawings, identical numerals refer to identical or corresponding parts. Redundant descriptions are appropriately simplified or omitted.

First Embodiment

Figure 1:
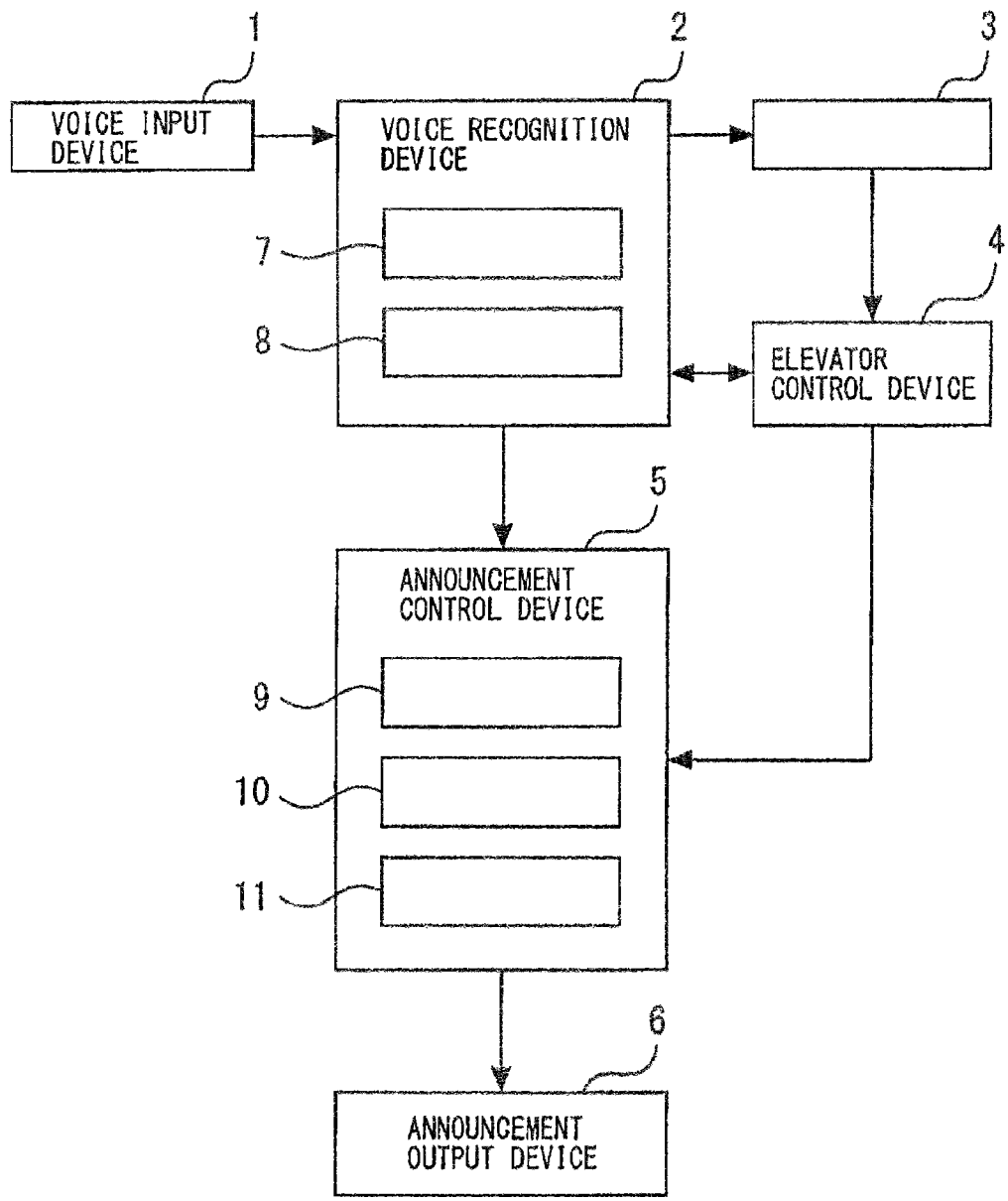
FIG. 1 is a block diagram showing an elevator device in a first embodiment of the present invention.

FIG. 1 is a block diagram showing an elevator device in a first embodiment of the present invention.

In FIG. 1, reference numeral 1 denotes a voice input device. Reference numeral 2 denotes a voice recognition device. Reference numeral 3 denotes a call registration device. Reference numeral 4 denotes an elevator control device. Reference numeral 5 denotes an announcement control device. Reference numeral 6 denotes an announcement output device.

The voice input device 1 and the voice recognition device 2 are devices through the use of which an elevator user registers his or her call by inputting his or her voice.

The voice input device 1 is, for example, a microphone. A user who wants to register his or her call by voice utters words indicating information on a service floor and the like to the voice input device 1. The voice input device 1 converts the inputted voice into prescribed voice data. The voice input device 1 sends the converted voice data to the voice recognition device 2. The voice input device 1 is installed in an elevator hall, for example. The voice input device 1 may be installed in an elevator car (not shown).

The voice recognition device 2 includes a condition determination section 7 and a voice analysis section 8.

The condition determination section 7 determines whether call registration by voice is possible. The condition determination section 7 performs the determination on the basis of, for example, elevator condition information obtained from the control device 4.

The control device 4 controls various kinds of actions of an elevator. Car run control and door opening and closing control are performed by the control device 4.

The control device 4 can detect various kinds of conditions of an elevator on the basis of input signals and output signals. For example, the control device 4 detects the opening and closing condition of an elevator door on the basis of signals inputted from a prescribed switch. Furthermore, on the basis of signals inputted from a prescribed rotary encoder, the control device 4 detects that an elevator door is performing opening and closing actions. On the basis of signals inputted from another rotary encoder, the control device 4 detects that a car is running. On the basis of signals inputted from a prescribed switch, the control device 4 detects that a car is at a standstill at a hall. On the basis of signals inputted from a weighing device, the control device 4 detects the number of users (including zero persons) in a car.

The control device 4 sends a detected condition of an elevator (information showing the condition of an elevator) as condition information to the voice recognition device 2 and the announcement control device 5. The method for detecting the condition of an elevator is not limited to the above-described examples. For example, signals from the voice recognition device 2, signals from the call registration device 3, signals from other detectors, and image signals from a camera (not shown) may be used in order to detect the condition of an elevator.

The condition determination section 7 does not permit call registration by voice, for example, in the case where an elevator door is performing opening and closing actions. That is, the condition determination section 7 determines that this is not a condition in which call registration by voice is possible.

As another example, in the case where there is only one user in a car, the condition determination section 7 permits call registration by voice. That is, the condition determination section 7 determines that this is a condition in which registration by voice is possible.

The condition determination section 7 can permit call registration by voice only in the case where there is no registered call.

The condition for permitting (not permitting) call registration by voice is not limited to the above-described examples. A call is not registered even when a user speaks to the voice input device 1 in the case where call registration by voice is not permitted by the condition determination section 7. This function can be realized by turning on the voice input device 1 (the acceptance of a voice input is permitted) or by making effective the analysis function of the voice analysis section 8, which will be described later, only when call registration is permitted by the condition determination section 7.

The voice analysis section 8 performs prescribed voice recognition processing of voice data received from the voice input device 1. The recognition processing is carried out only when call registration by voice is permitted by the condition determination section 7. Floor data for identifying a destination floor of a user (words for voice call registration actions) is registered beforehand in the voice recognition device 2. The voice analysis section 8 determines whether voice data received from the voice input device 1 is in agreement with the pre-registered floor data under prescribed conditions. When the voice analysis section 8 determines that the voice data is in agreement with the pre-registered data, the voice analysis section 8 sends prescribed agreement information to the call registration device 3. The agreement information includes information on floor data with which the voice data is in agreement under the conditions.

Upon receipt of the agreement information from the voice recognition device 2, the call registration device 3 sends a call registration request corresponding to the floor data to the control device 4. Upon receipt of the call registration request from the call registration device 3, the control device 4 performs the car response control on the basis of the received call registration request.

The call registration device 3 may receive prescribed information from devices other than the voice recognition device 2 in addition to the information from the voice recognition device 2. In this case, upon receipt of the information from devices other than the voice recognition device 2, the call registration device 3 generates a call registration request on the basis of the received information and sends the call registration request to the control device 4.

The announcement control device 5 and the announcement output device 6 are devices through the use of which an announcement (voice guidance) is performed to an elevator user. The announcement output device 6 is, for example, a speaker. The announcement output device 6 is controlled by the announcement control device 5.

When prescribed conditions requiring the output of announcement hold, the voice recognition device 2 and the control device 4 send announcement requests to the announcement control device 5. The announcement control device 5 causes the announcement output device 6 to output an appropriate announcement on the basis of the announcement request received from the voice recognition device 2 and the announcement request received from the control device 4. In order to realize this function, the announcement control device 5 includes a re-output determination section 9, a storage section 10, and an output control section 11.

The re-output determination section 9 determines whether it is necessary to re-output an announcement on the basis of prescribed conditions. The function of the re-output determination section 9 will be described later.

Data necessary for making an announcement (announcement data) is stored in the storage section 10.

The output control section 11 controls the output of announcement data, i.e., the output of an announcement from the announcement output device 6. The output control section 11 performs the control on the basis of the announcement request received from the voice recognition device 2 and the announcement request received from the control device 4. Furthermore, the output control section 11 performs the control also in consideration of determination results of the re-output determination section 9 and condition information from the control device 4 as required.

For example, an announcement is made in order to improve operability when a user registers his or her call by inputting his or her voice. Announcement data concerning voice call registration (registration announcement data) is stored beforehand in the storage section 10.

For example, in order to provide information on analysis results of the voice analysis section 8, the voice recognition device 2 sends a corresponding announcement request to the announcement control device 5. Furthermore, the voice recognition device 2 sends a corresponding announcement request to the announcement control device 5 to ascertain whether a call should be registered according to the analysis results of the voice analysis section 8, to encourage a user to speak, and to inform a user that voice input is possible. Registration announcement data corresponding to each of the announcement requests is stored in the storage section 10. The output control section 11 selects announcement data to be outputted on the basis of a received announcement request.

As another example, the voice recognition device 2 sends a prescribed announcement request to the announcement control device 5 at the start of the acceptance of a voice input (voice recognition processing). The acceptance of a voice input (voice recognition processing) is limited by the condition determination section 7 to a prescribed given period. When the acceptance of a voice input changes from the condition of non-permission to the condition of permission, the voice recognition device 2 sends the announcement request.

Upon receipt of the announcement request from the voice recognition device 2, the announcement control device 5 obtains from the control device 4 a call registration condition (information concerning a registered call) at this point of time. The output control section 11 causes the announcement output device 6 to output an announcement concerning the call registration condition on the basis of the condition information received from the control device 4.

In this case, if the voice input device 1 is installed in a hall, the announcement control device 5 receives information on the direction of a registered call (upward, downward) as condition information from the control device 4. If a device capable of registering destination floors is installed in a hall, the announcement control device 5 receives information on destination floors of a car (in the case where there are a plurality of cars, for each car) as condition information from the control device 4. In the case where the voice input device 1 is installed in a car, the announcement control device 5 receives information on floors at which the car stops as condition information from the control device 4.

It is possible to improve the convenience for a user by providing information through such an announcement. For example, even when a device for indicating the call registration condition is not installed in the vicinity of the voice input device 1, a user can grasp the call registration condition at this point of time. It is possible to reliably inform also a visually-handicapped user of the call registration condition at this point of time. A user does not need to speak when a call which the user is going to register has already been registered. For this reason, it is possible to reduce the occurrence of the trouble that unnecessary calls are registered by wrong recognition of voices.

In the above-described example, before an announcement is outputted from the announcement output device 6, whether the output of the announcement is necessary may be determined. For example, the output control section 11 performs the determination on the basis of condition information (for example, information concerning a registered call) received from the control device 4. If the number of already registered floors is larger among floors at which a car can stop, the output control section 11 determines that the output of an announcement is necessary. In this case, the output control section 11 causes the announcement output device 6 to output an announcement concerning the registration condition of a call. This is because the possibility that the call which a user is going to register has already been registered is high.

On the other hand, if the number of already registered floors is smaller among floors at which a car can stop, the output control section 11 determines that the output of an announcement is unnecessary. In this case, the output control section 11 does not cause the announcement output device 6 to provide the call registration condition as information. This is because the possibility that the call which a user is going to register has not yet been registered and that the user carries out actions for registering the call later is high. It is possible to reduce the waiting time of a user (the time during which a user waits for the finish of an announcement) by not making an announcement, and hence it is possible to improve convenience.

An announcement is made also in order to provide elevator operation information and general information. In addition to registration announcement data, announcement data concerning elevator operation information (operation announcement data) and announcement data concerning general information (general announcement data) are stored beforehand in the storage section 10. Operation announcement data includes, for example, data for making the start of a control operation known to users and data for calling attention to the opening and closing of a door. General announcement data includes, for example, data for explaining the method of using an elevator.

Figure 2:
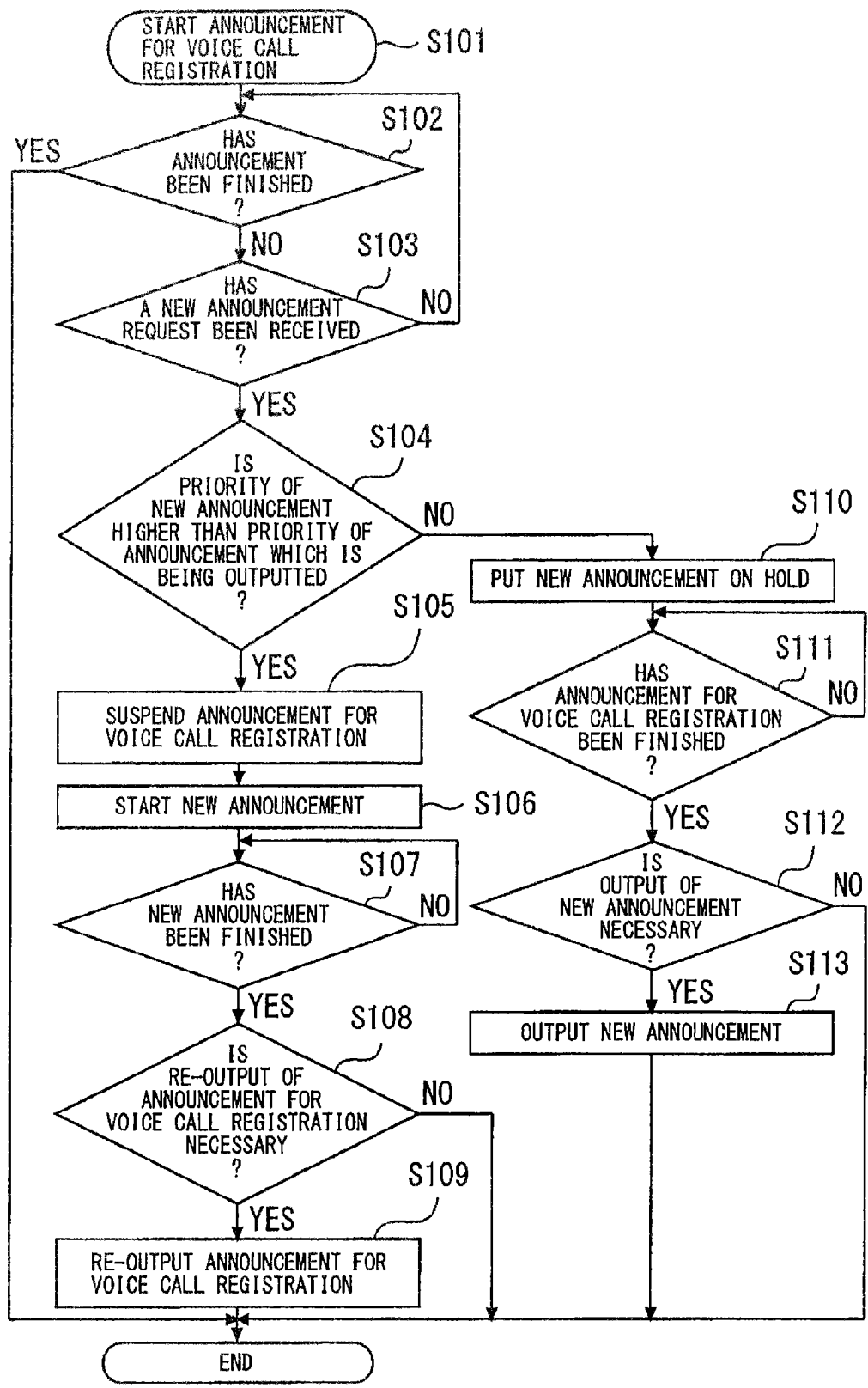
FIG. 2 is a flowchart showing actions of the elevator device in the first embodiment of the present invention.

Next, with reference to also FIG. 2, a description will be given of specific actions of the elevator device (in particular, the announcement control device 5) having the above-described configuration. FIG. 2 is a flowchart showing actions of the elevator device in the first embodiment of the present invention.

Upon receipt of a prescribed announcement request from the voice recognition device 2, the announcement control device 5 starts an announcement for voice call registration (hereinafter, referred to as "the first announcement" in order to identify this announcement) (S101). That is, the voice recognition device 2 sends an announcement request for the first announcement. Upon receipt of this announcement request from the voice recognition device 2, the output control section 11 selects registration announcement data corresponding to the first announcement from the storage section 10. The output control section 11 outputs the selected registration announcement data to the announcement output device 6. As a result of this, the first announcement is outputted from the announcement output device 6.

Next, the announcement control device 5 determines whether the first announcement has been finished (S102). In the case where the first announcement has been finished (Yes in S102), the announcement control device 5 finishes actions.

In the case where the first announcement has not been finished, that is, the first announcement is being outputted, the announcement control device 5 determines whether a new announcement request has been received (S103). In the case where a new announcement request has not been received, the flow of processing returns to the processing of S102.

Upon receipt of another announcement request during the output of the first announcement (Yes in S103), the announcement control device 5 makes a comparison between the priority of the new announcement (hereinafter, referred to as "the second announcement" in order to identify this announcement) and the priority of the announcement which is being outputted (the first announcement) (S104).

Priority is set beforehand for each announcement (i.e., each announcement request). Priority is linked to announcement data and stored in the storage section 10. Priority may be set at different values which differ from announcement to announcement. It is also possible to classify announcements and to set priority for each classification. In this case, announcements may be classified as registration announcement, operation announcement, and general announcement.

In the case where as a result of the comparison in S104, the priority of the second announcement is higher than the priority of the first announcement (Yes in S104), the output control section 11 suspends the first announcement (S105). After the first announcement is stopped, the output control section 11 causes the announcement output device 6 to provide the second announcement as information (S106). That is, the output control section 11 selects registration announcement data corresponding to the second announcement from the storage section 10. The output control section 11 outputs the selected registration announcement data to the announcement output device 6. As a result of this, the second announcement is outputted from the announcement output device 6.

Next, the announcement control device 5 determines whether the second announcement has been finished (S107). For example, by receiving a notice about the finish from the announcement output device 6, the announcement control device 5 detects that the second announcement has been finished. When the second announcement has been finished (Yes in S107), the announcement control device 5 determines whether the re-output of the first announcement is necessary (S108). This determination is performed by the re-output determination section 9.

In the case where prescribed conditions hold, the re-output determination section 9 determines that the re-output of the first announcement is necessary (Yes in S108). In this case, the output control section 11 causes the announcement output device 6 to output the first announcement (S109). At this time, the output control section 11 outputs the first announcement suspended in S105 from the beginning.

On the other hand, in the case where the prescribed conditions do not hold, the re-output determination section 9 determines that the re-output of the first announcement is unnecessary (No in S108). In this case, the output control section 11 does not cause the announcement output device 6 to re-output the first announcement. For this reason, also the actions of the announcement control device 5 are finished by finishing the second announcement.

Next, conditions for determining whether the re-output of the first announcement is necessary will be specifically described.

For example, on the basis of condition information received from the control device 4, the re-output determination section 9 determines whether the re-output of the first announcement is necessary. When the second announcement is finished in S107 and the re-output of the first announcement becomes possible, the announcement control device 5 obtains condition information from the control device 4.

For example, on the basis of obtained condition information, the re-output determination section 9 determines whether a control operation is being performed. A control operation is performed when some kind of emergency situation occurs. If the first announcement is outputted in this condition, this hinders evacuation. For this reason, the re-output determination section 9 determines that the re-output of the first announcement is unnecessary if a control operation is being performed at the point of time when the re-output of the first announcement becomes possible (for example, when the second announcement is finished, or when it is determined whether the re-output is necessary). The re-output determination section 9 determines that the re-output of the first announcement is necessary if a control operation is not being performed.

As another example, on the basis of obtained condition information, the re-output determination section 9 determines whether a car has moved after the suspension of the first announcement. In an announcement for voice call registration, as described above, after the notification about analysis results of the voice analysis section 8, whether a call should be registered according to the analysis results of the voice analysis section 8 is provided as information. If a car moves after the notification about the analysis results (a floor) from the announcement output device 6, the floor in question may sometimes become a floor incapable of being registered. In this case, if the announcement is restarted and whether the call should be registered according to the analysis results is provided as information, the user becomes confused.

For this reason, in the case where a car position at the point of time when the re-output of the first announcement became possible does not coincide with the car position at the point of time when the first announcement was suspended, the re-output determination section 9 determines that the re-output of the first announcement is unnecessary. In the case where a car is at a standstill at the same floor before and after the suspension of the first announcement, the re-output determination section 9 determines that the re-output of the first announcement is necessary.

As a further example, on the basis of obtained condition information, the re-output determination section 9 determines whether there is a user in a car. This determination is effective in the case where the voice input device 1 is installed in the car. In the case where there is a user in the car at the point of time when the re-output of the first announcement becomes possible, the re-output determination section 9 determines the re-output of the first announcement is necessary. In the case where there is no user in the car, the re-output determination section 9 determines that the re-output of the first announcement is unnecessary.

The re-output determination section 9 may determine whether the re-output of the first announcement is necessary on the basis of the time which elapses after the stop of the first announcement. The re-output determination section 9 regards, for example, a prescribed point of time when the second announcement has been finished and when the re-output of the first announcement becomes possible as the end of the elapsed time. If a time longer than a given period elapses, the necessity for the re-output of the suspended first announcement becomes considerably low. If the first announcement is restarted when a user has forgotten about the first announcement, the user may be confused.

For this reason, in the case where at least a given time elapses until the re-output of the first announcement becomes possible after the suspension of the first announcement, the re-output determination section 9 determines that the re-output of the first announcement is unnecessary. In the case where the given time does not elapse, the re-output determination section 9 determines that the re-output of the first announcement is necessary.

The re-output determination section 9 may determine whether the re-output of the first announcement is necessary on the basis of the amount of the first announcement outputted before the stop in S107. Even when all of the first announcement is not outputted (played), a user can grasp the meaning of the first announcement. It is unnecessary to re-output the announcement whose meaning has been transmitted to a user. For this reason, in the case where an audio output of at least a prescribed percentage (for example, not less than 80%) is performed before the stop, the re-output determination section 9 determines that the re-output of the first announcement is unnecessary. In the case where only an audio output of less than a prescribed percentage is performed before the stop, the re-output determination section 9 determines that the re-output of the first announcement is necessary.

The re-output determination section 9 may determine whether the re-output of the first announcement is necessary on the basis of determination results of the condition determination section 7. For example, in the case where call registration by voice is permitted by the condition determination section 7, the re-output determination section 9 determines that the re-output of the first announcement is necessary. In the case where call registration by voice is not permitted by the condition determination section 7, the re-output determination section 9 determines that the re-output of the first announcement is unnecessary.

The re-output determination section 9 determines whether the re-output of the first announcement is necessary on the basis of the kind of the first announcement which is stopped in S107.

As the conditions for determining whether the re-output of the first announcement is necessary, one of the above-described conditions may be adopted or a combination of a plurality of conditions may be adopted. The conditions are not limited to the above-described examples.

As a result of the comparison in S104, in the case where the priority of the first announcement is higher than the priority of the second announcement (No in S104), the output control section 11 puts the output of the second announcement on hold, and continues the output of the first announcement (S110).

Next, the announcement control device 5 determines whether the first announcement has been finished (S111). When the first announcement is finished (Yes in S111), the announcement control device 5 determines whether the output of the second announcement is necessary (S112). This determination may be performed on the basis of conditions similar to the conditions in S108.

In the case where the output of the second announcement is necessary (Yes in S112), the output control section 11 causes the announcement output device 6 to output the second announcement (S112). In the case where the output of the second announcement is unnecessary (No in S112), the output control section 11 does not cause the announcement output device 6 to output the second announcement.

For this reason, when the first announcement is finished, also the actions of the announcement control device 5 are finished.

An elevator device having the above-described configuration can become capable of announcing appropriate information at appropriate timing.

In this embodiment, a detailed description has been given of the case where while an announcement for voice call registration is being made, the announcement control device 5 receives another announcement request. This is illustrative only of the present invention. For example, actions similar to the above-described actions are performed also in the case where while another announcement is being made, the announcement control device 5 receives an announcement request for voice call registration.

INDUSTRIAL APPLICABILITY

The elevator device of the present invention can be applied to an elevator device provided with a device through the use of which a user registers his or her call by inputting his or her voice.

REFERENCE SIGNS LIST 1 voice input device
2 voice recognition device
3 call registration device
4 control device
5 announcement control device
6 announcement output device
7 condition determination section
8 voice analysis section
9 re-output determination section
10 storage section
11 output control section

The invention claimed is:
1. An elevator device comprising:
a voice input device;
a voice recognition device which performs prescribed voice recognition processing of voice data inputted from the voice input device and determines whether the voice data is in agreement with pre-registered data under prescribed conditions;
a call registration device which, in the case where the voice recognition device determines that the voice data is in agreement with the pre-registered data, sends a call registration request corresponding to the pre-registered data;
a control device which performs car response control on the basis of the call registration request received from the call registration device; and
an announcement control device which controls an announcement output device on the basis of an announcement request from the voice recognition device and an announcement request from the control device, wherein
the announcement control device, upon receipt of an announcement request for a second announcement having higher priority than a first announcement while the announcement control device is causing the announcement output device to output the first announcement, stops the first announcement and causes the announcement output device to output the second announcement, the announcement control device determines whether re-output of the first announcement is necessary, and in the case where the announcement control device determines that the re-output of the first announcement is necessary, upon finish of the second announcement, the announcement control device causes the announcement output device to re-output the first announcement.

2. The elevator device according to claim 1, wherein in the case where the announcement control device determines that the re-output of the first announcement is unnecessary, upon finish of the second announcement, the announcement control device does not cause the announcement output device to re-output the first announcement.

3. The elevator device according to claim 1, wherein
the control device outputs information showing a prescribed condition of an elevator as condition information, and
the announcement control device determines whether the re-output of the first announcement is necessary on the basis of the condition information received from the control device.

4. The elevator device according to claim 3, wherein the announcement control device determines whether the re-output of the first announcement is necessary on the basis of whether a control operation is being performed when the re-output of the first announcement becomes possible.

5. The elevator device according to claim 3, wherein the announcement control device determines whether the re-output of the first announcement is necessary on the basis of a car position at the point of time when the first announcement is stopped and a car position at the point of time when the re-output of the first announcement becomes possible.

6. The elevator device according to claim 3, wherein the announcement control device determines whether the re-output of the first announcement is necessary on the basis of whether there is a user in a car when the re-output of the first announcement becomes possible.

7. The elevator device according to claim 1, wherein the announcement control device determines whether the re-output of the first announcement is necessary on the basis of a time which elapses after the first announcement is stopped.

8. The elevator device according to claim 1, wherein the announcement control device determines whether the re-output of the first announcement is necessary on the basis of an amount of the first announcement outputted before the stop.

9. The elevator device according to claim 1, wherein
the control device outputs information concerning a registered call as condition information,
the voice recognition device limits voice recognition processing to a given period and outputs a prescribed announcement request at the start of voice recognition processing, and
the announcement control device, upon receipt of the prescribed announcement request from the voice recognition device, causes the announcement output device to output an announcement concerning a call registration condition on the basis of the condition information received from the control device.

10. The elevator device according to claim 9, wherein
the announcement control device determines whether the output of the announcement concerning the call registration condition is necessary on the basis of the condition information received from the control device, and
in the case where the announcement control device determines that the output of the announcement concerning the call registration condition is necessary, the announcement control device causes the announcement output device to output the announcement concerning the call registration condition.

11. The elevator device according to claim 10, wherein the announcement control device, in the case where the announcement control device determines that the output of the announcement concerning the call registration condition is unnecessary, the announcement control device does not cause the announcement output device to output the announcement concerning the call registration condition.

* * * * *